UNITED STATES PATENT OFFICE.

ALBERT L. R. VAN DEN BERGHEN, OF CHICAGO, ILLINOIS, ASSIGNOR OF ONE-HALF TO FRANK BARTOLOMEI, OF SAME PLACE.

PROCESS OF FACING BRICKS, TILES, &c.

SPECIFICATION forming part of Letters Patent No. 521,226, dated June 12, 1894.

Application filed September 20, 1893. Serial No. 486,017. (No specimens.)

*To all whom it may concern:*

Be it known that I, ALBERT L. R. VAN DEN BERGHEN, a subject of the King of Belgium, residing at Chicago, Cook county, Illinois, have invented certain new and useful Improvements in Processes of Facing Bricks, Tiles, &c.; and I do hereby declare the following to be a full, clear, and exact description of the invention, such as will enable others skilled in the art to which it appertains to make and use the same.

My invention relates to an improvement in processes of facing bricks, tiles, and similar articles.

The object of my improved process is to produce a facing on bricks. By this process, bricks which have rough faces unfit for use in the fronts of buildings, may be coated with a layer of facing material which will be smooth and of good appearance, so that such bricks, so prepared, may be used in any place where the finer qualities of bricks are ordinarily required. Or the finer qualities of bricks may be faced by my process, and used for building purposes, where such ornamental bricks are appropriate.

Another object of my process is to produce a design or pattern of various colors on such facings, which, when the bricks are placed in the wall, will serve as a decorative feature of the building.

With these objects in view, my invention consists in first spreading a thin layer of pasty or semi-liquid facing material over a plane surface to which such facing material will not adhere, then immersing the desired faces of the bricks in the said material, and permitting them to stand until the liquid facing material has hardened, and finally separating and removing the bricks, which are then ready to place in the wall, the sides which are coated with the facing material being placed outward.

My invention also consists in first spreading a layer of liquid or semi-liquid facing material of various colors on a plane surface, to form a design, then imposing the desired faces of the bricks upon the said material, the bricks preferably being nearly, but not quite, in contact with each other, and being permitted to stand upon said material until the latter has hardened, after which the bricks are removed, and may be placed in a wall, as before, in the same relative positions which they occupied while being coated, thus presenting the same design on the front of the wall which existed in the facing material, when spread on the plane surface.

To carry out my invention, I take a supporting surface of any suitable material having no, or only slight, adhesion for the pasty or plastic facing material, such as a plate of glass, or a marble slab, and I spread upon the same a layer of liquid, semi-liquid, pasty or plastic material, having little or no adhesion for the supporting surface, but which strongly adheres to the bricks or other articles to be faced, after the same has hardened. For example, I may use semi-liquid brick-clay or enameling composition, while yet soft, as the facing material. After the facing material has been spread upon the supporting surface, I place the baked brick or bricks upon the said facing material and allow them to remain thereon until such facing material has sufficiently hardened, whereupon the now coated or faced brick or bricks are removed therefrom. This is readily done, inasmuch as the facing material, when hardened, does not adhere to the supporting surface, but only to the bricks, as before stated. The bricks thus faced are then ready for use, or, if desired, they may be burned or baked a second time. The facing material may be of one uniform color or it may be composed of sections of semi-liquid material of various colors, so arranged upon the supporting surface as to produce any desired design upon the building or structure on which the bricks are to be employed, before placing the bricks thereon to be coated. The supporting surface upon which the facing material is spread may, as before stated, be a plain glass plate, a stone slab, or other suitable plane smooth surface to which the facing material will not adhere, or it may be provided with any suitable grain or relief, or intaglio design, which will produce the desired grain, intaglio, or relief design upon the facing adhering to the bricks. It is necessary, when placing the bricks upon the facing material in close proximity to each other, to insert strips, preferably of sheet-metal, between the bricks, to prevent their sticking to each other, the said strips preferably penetrating the layer of facing material.

While I have particularly referred to bricks in the above description, as the articles to be coated, it is plain that tiles, or any other articles, may be coated by the same process, without departing from the spirit of my invention.

It will be seen that under my invention, the articles may be coated with a facing material which will materially enhance the appearance of rough and low grade bricks, and permit the same to be used where bricks of a higher quality would otherwise have to be used. This facing may be in one color, or it may be arranged in various colors, so as to form the desired design when the bricks are put together in the building or structure of which they are to form a part. The colored design may be so arranged on the supporting grate that the bricks will have different colored facings, the facing of each brick, however, being of one uniform color, or some or all of the bricks may have each a multicolored facing. The bricks moreover, may be provided with a relief or intaglio design, either alone or in connection with a multicolored design. In all cases the supporting surface serves to impart to the facing material the smooth and finished appearance, whether plain or in relief, which is required for the fronts and other walls of the better class of buildings or other structures.

What I claim, and desire to secure by Letters Patent, is—

1. The process of facing bricks, tiles, &c., consisting in first spreading a layer of liquid or semi-liquid facing material on a supporting surface, then imposing the desired face of the article to be coated upon the said facing material while the latter is still soft, allowing it to stand in such material until the material has hardened, and finally removing the article with the coating attached to it, substantially as set forth.

2. The process of facing bricks, tiles, &c., consisting in first spreading a layer of liquid or semi-liquid facing material of various colors, in the form of a design, onto a supporting surface, then imposing the desired faces of the articles to be coated, in the said facing material while the latter is still soft, allowing them to stand in such position until the material has hardened, and finally, removing the article with the coating attached to it, substantially as set forth.

3. The process of facing bricks, tiles, &c., which consists in first spreading a liquid or semi-liquid facing material on a surface provided with a suitable design, which it is desired to impress on the face of the article to be coated, then imposing the desired face of the article to be coated upon the facing material while the latter is still soft, allowing it to remain until the facing material has hardened, and finally, removing the article with the coating attached to it, substantially as set forth.

4. The process of facing bricks, tiles, &c., which consists in first spreading a pasty facing material, of various colors, in the form of a design, onto a surface provided with a suitable design, which it is desired to impress on the face of the article to be coated, then immersing the desired faces of the articles to be coated, in the facing material while the latter is still soft, said articles being placed in close proximity to each other, allowing the articles to remain in this position until the facing material has hardened, and finally removing the articles with the coating attached, substantially as set forth.

5. The process of facing bricks, tiles, &c., which consists in first spreading a layer of liquid or semi-liquid material upon a supporting surface, then placing thereon the articles to be faced, in proximity to each other, and interposing separating strips between them, allowing the articles to remain on the facing material until the same has hardened, and then removing them from the supporting surface, substantially as set forth.

In testimony whereof I affix my signature in presence of two witnesses.

ALBERT L. R. VAN DEN BERGHEN.

Witnesses:
LEON DUBOIS,
C. GREGOIRE.